US006496159B2

(12) United States Patent
Noro

(10) Patent No.: US 6,496,159 B2
(45) Date of Patent: Dec. 17, 2002

(54) SIMPLE HELICAL ANTENNA AND METHOD OF PRODUCING THE SAME

(75) Inventor: Junichi Noro, Akita (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/941,211

(22) Filed: Aug. 28, 2001

(65) Prior Publication Data

US 2002/0024476 A1 Feb. 28, 2002

(30) Foreign Application Priority Data

Aug. 28, 2000 (JP) ....................................... 2000-256799

(51) Int. Cl.[7] .................................................. H01G 1/36
(52) U.S. Cl. ....................................... 343/895; 343/702
(58) Field of Search ................................ 343/895, 702, 343/700 MS

(56) References Cited

U.S. PATENT DOCUMENTS 6,094,179 A * 7/2000 Davidson .................... 343/895
6,285,340 B1 * 9/2001 Park et al. .................. 343/895

* cited by examiner

*Primary Examiner*—Don Wong
*Assistant Examiner*—James Clinger
(74) *Attorney, Agent, or Firm*—Frishauf, Holtz, Goodman & Chick, P.C.

(57) ABSTRACT

In manufacturing a helical antenna, use is made of a cylindrical member having a peripheral surface. A helical conductor is attached to the peripheral surface and extends along the peripheral surface to make a helical fashion. The helical conductor may be obtained as follows. At first, a mask layer is formed on the peripheral surface of the cylindrical member with a helical gap left therein. Metal particles are attached onto the mask layer and onto the peripheral surface through the helical gap. Next, the mask layer is detached from the outer peripheral surface of the cylindrical member while the metal particles are left as the helical conductor on the outer peripheral surface.

2 Claims, 5 Drawing Sheets

SIMPLE HELICAL ANTENNA AND METHOD OF PRODUCING THE SAME

BACKGROUND OF THE INVENTION

This invention relates to a digital radio receiver for receiving a radio wave from an artificial satellite (which may be called a "satellite wave") or a radio wave from a ground station (which may be called a "ground wave") to listen to digital radio broadcasting and, in particular, to an antenna for use in the digital radio receiver as well as a method of producing the antenna.

In recent years, a digital radio receiver for receiving a satellite wave from an artificial satellite or a ground wave from a ground station to listen to digital radio broadcasting has been developed and is put into practical use in the United States of America. The digital radio receiver is mounted on a mobile station such as a vehicle and is adapted to receive a radio wave having a frequency of about 2.3 GHz to listen to the digital radio broadcasting. In other words, the digital radio receiver is a radio receiver capable of listening to mobile broadcasting. It is noted here that the ground wave is a radio wave obtained by slightly shifting the frequency of the satellite wave after it is received by the ground station.

In order to receive the radio wave having the frequency of about 2.3 GHz, it is necessary to mount an antenna at a position outside the vehicle. Such antenna may have various structures but a stick type is generally used rather than a planar type (flat type). As well known, an electromagnetic wave emitted into a free space is a transversal wave having an electric field and a magnetic field vibrating in a plane perpendicular to a propagating direction of the wave. The electric field and the magnetic field are variable in intensity within the above-mentioned plane. Such electromagnetic wave in which the direction of the electric field is not random but constant or varied in some regular way is referred to as a polarized wave. The satellite wave is a circular polarized wave exhibiting circular polarization while the ground wave is a linear polarized wave exhibiting linear polarization.

Hereinafter, description will mainly be made of an antenna for receiving the satellite wave. As one of stick-type antennas, a helical antenna is known. The helical antenna comprises a hollow or solid cylindrical member and a conductor wire wound around the cylindrical member in a helical fashion and can efficiently receive the above-mentioned circular polarized wave. Therefore, the helical antenna is exclusively or mainly used to receive the satellite wave.

An existing helical antenna is produced by preparing a cylindrical member or a pole, forming an antenna pattern on a flexible substrate to obtain a patterned film, and winding the patterned film on the cylindrical member or the pole.

However, the helical antenna comprising the patterned film wound around the cylindrical member or the pole is complicated in structure, resulting in a bar to reduction in cost.

SUMMARY OF THE INVENTION

It is therefore an object of this invention to provide a helical antenna which is further simplified in structure and is reduced in cost.

It is another object of this invention to provide a method of producing the above-mentioned helical antenna.

Other objects of the present invention will become clear as the description proceeds.

According to the present invention, there is provided a helical antenna comprising a cylindrical member having a peripheral surface and a helical conductor attached to said peripheral surface and extending along said peripheral surface to make a helical fashion.

According to the present invention, there is provided a method of producing the helical antenna. The method comprises the steps of preparing the cylindrical member, forming a mask layer on the peripheral surface of the cylindrical member with a helical gap left in the mask layer, attaching metal particles onto the mask layer and onto the peripheral surface through the helical gap, and detaching the mask layer from the peripheral surface with the metal particles left as the helical conductor on the outer peripheral surface.

According to the present invention, there is provided a method of producing the helical antenna. The method comprises the steps of preparing the cylindrical member, forming a conductor layer on the peripheral surface of the cylindrical member, forming a mask layer on the conductor layer with a helical gap left in the mask layer, forming a metal plating layer on the conductor layer through the helical gap, and removing, with the metal particles left as the helical conductor on the outer peripheral surface, from the peripheral surface the mask layer and a masked part of the conductor layer which is covered with the mask layer.

DESCRIPTION OF THE PREFERRED EMBODIMENTS

Figure 1:
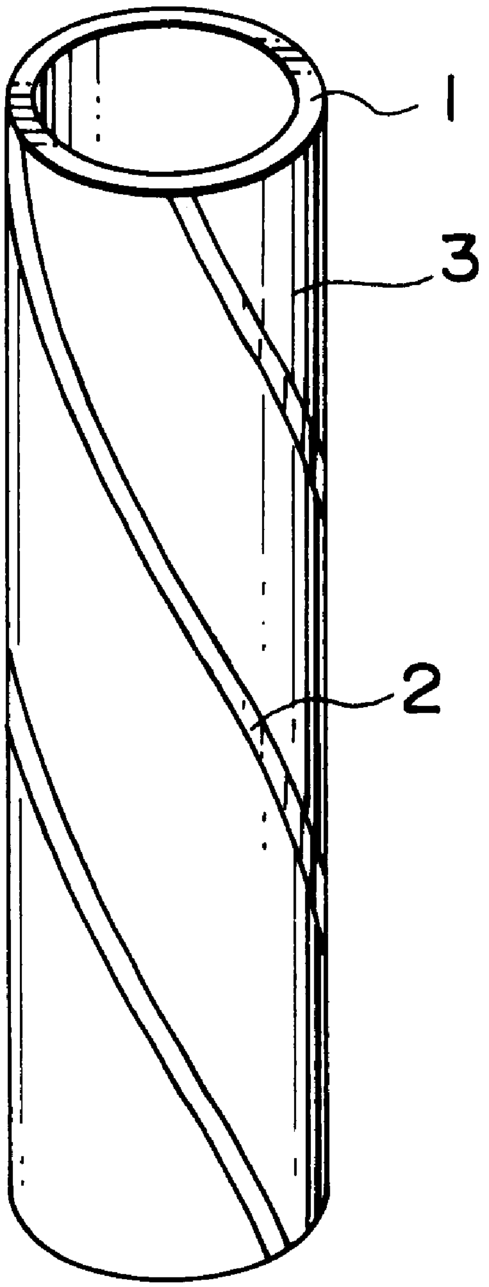
FIG. 1 is a perspective view of a helical antenna according to an embodiment of this invention.

Now, embodiments of this invention will be described with reference to the drawing.

At first referring to FIG. 1, a helical antenna according to one embodiment of this invention comprises an insulating cylindrical member 1 as a bobbin and a helical conductor 2 directly attached to an outer peripheral surface 3 of the cylindrical member 1 to serve as an antenna pattern. The helical conductor 2 extends along the outer peripheral surface 3 of the cylindrical member 1 in a helical fashion. As will later be described, the helical conductor 2 can easily be formed by one or a plurality of known techniques such as sputtering, vacuum vapor deposition, chemical plating, and electroless plating.

Referring to FIGS. 2A, 2B, 3A, 3B, 4A, and 4B, description will be made of a method of producing the helical antenna illustrated in FIG. 1.

Figure 2A:
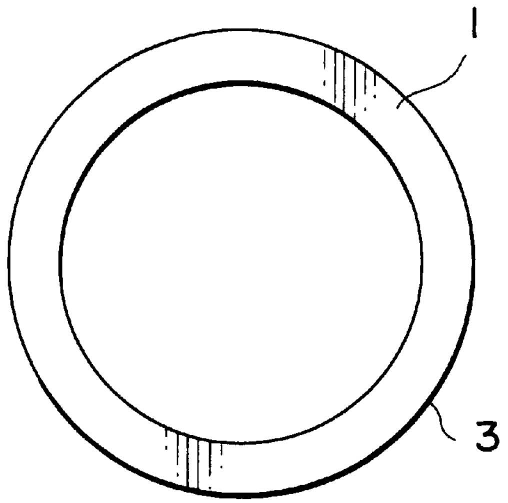
FIGS. 2A and 2B are views for describing a method of producing the helical antenna illustrated in FIG. 1 and show a cylindrical member used in the helical antenna in a top end view and a schematic side view in a reduced scale, respectively.
Figure 2B:
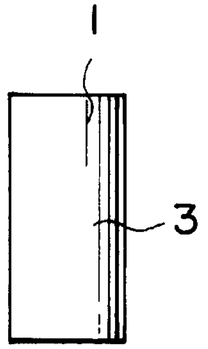

At first referring to FIG. 2A, the cylindrical member 1 is prepared. As illustrated in FIG. 2B, the cylindrical member 1 has a side surface as the outer peripheral surface 3 which is a smooth surface.

Figure 3A:
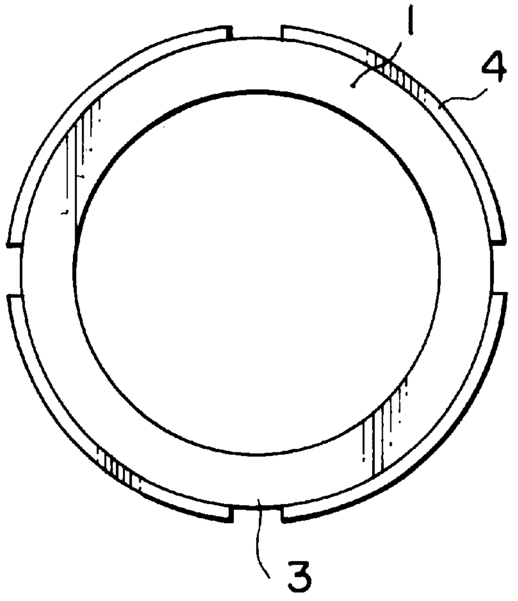
FIGS. 3A and 3B are views similar to FIGS. 2A and 2B, respectively, in a state after a mask layer is formed.
Figure 3B:
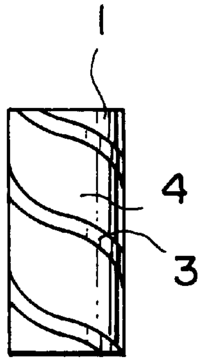

Next referring to FIGS. 3A and 3B, a mask layer 4 having a helical pattern is formed on the outer peripheral surface 3 of the cylindrical member 1. The helical pattern of the mask layer 4 appears as parallel stripes with parallel helical gaps defined therebetween, as schematically illustrated in FIG. 3B.

Then, metal particles such as copper are adhered to the outer peripheral surface 3 of the cylindrical member 1 through the mask layer 4 by vapor deposition or the like to form a metal layer. As a result, the metal particles are attached onto the mask layer and onto the outer peripheral surface 3 through the helical gaps.

Figure 4A:
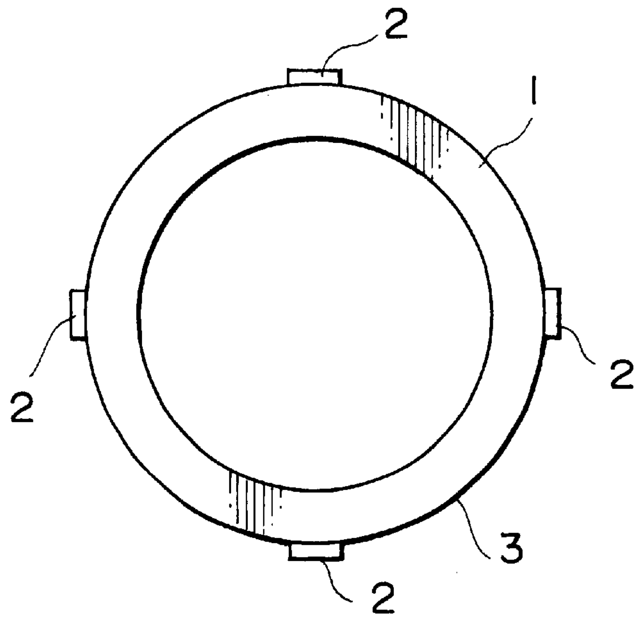
FIGS. 4A and 4B are views similar to FIGS. 3A and 3B, respectively, in a state after a helical conductor is formed.
Figure 4B:
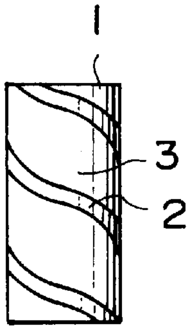

Thereafter, the mask layer 4 is detached from the outer peripheral surface 3 of the cylindrical member 1 together with a part of the metal layer which is formed on the mask layer 4. As a result, as illustrated in FIGS. 4A and 4B, the other part of the metal layer is left on the outer peripheral surface 3 of the cylindrical member 1 as the helical conductor 2. In the above-mentioned manner, the helical antenna is obtained which has the helical conductor 2 extending along the outer peripheral surface 3 of the cylindrical member 1 to serve as the antenna pattern.

Figure 5A:
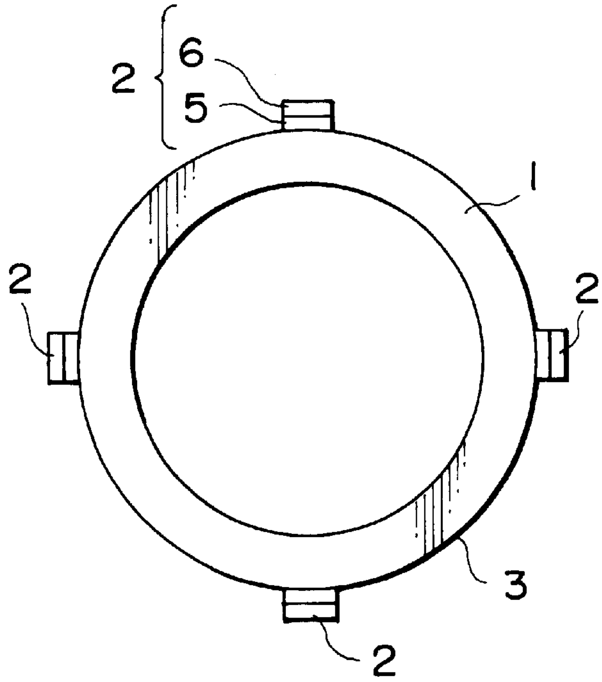
FIGS. 5A and 5B are views similar to FIGS. 4A and 4B, respectively, for describing a modification of the method described in conjunction with FIGS. 2A to 4B.
Figure 5B:
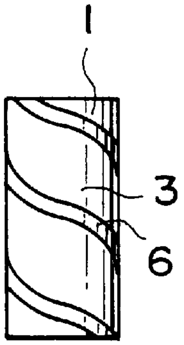

Referring to FIGS. 5A and 5B, a modification of the above-mentioned method will be described.

As noted above, the metal layer is partially used as the antenna pattern. If the thickness of the metal layer is insufficient, the metal layer is subjected to metal plating to increase the thickness. Taking this into account, the method may further comprise the step of forming a metal plating layer on the metal layer formed by vapor deposition. In this case, a combination of a metal layer part 5 and a plating layer part 6 left on the outer peripheral surface 3 of the cylindrical member 1 serves as the helical conductor 2. It is to be noted that the vapor deposition may be replaced by sputtering.

Referring to FIGS. 6A, 6B, 7A, 7B, 8A, 8B, 9A, and 9B, the description will be made of another method of producing the helical antenna illustrated in FIG. 1.

Figure 6A:
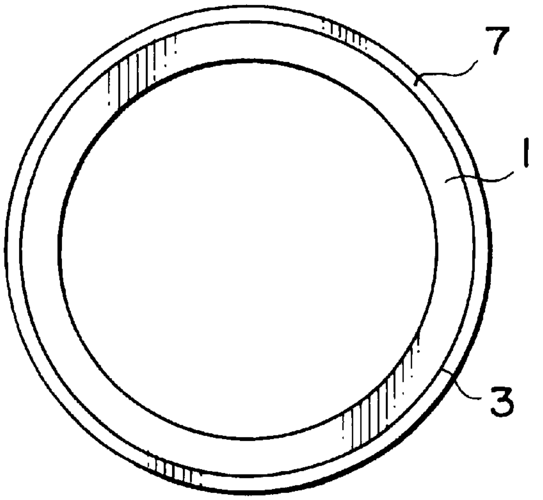
FIGS. 6A and 6B are views for describing another method of producing a helical antenna and show a cylindrical member used in the helical antenna in a top end view and a schematic side view in a reduced scale, respectively.
Figure 6B:
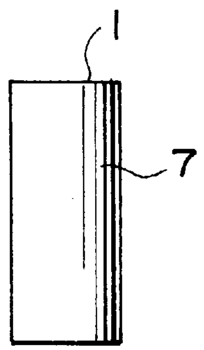

At first referring to FIGS. 6A and 6B, a cylindrical member 1 is subjected to activating treatment, such as sputtering, throughout an entire region of its outer peripheral surface 3 of the cylindrical member 1 to form an activated layer 7 comprising a conductor. Preferably, the outer peripheral surface 3 of the cylindrical member 1 is roughened prior to the activating treatment.

Figure 7A:
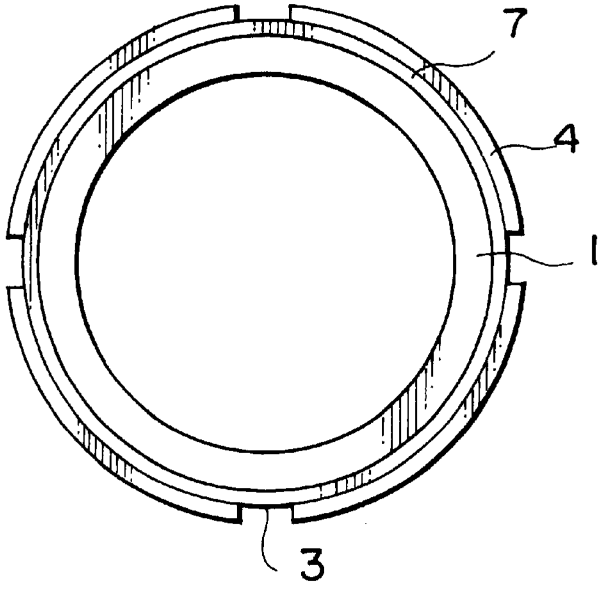
FIGS. 7A and 7B are views similar to FIGS. 6A and 6B, respectively, in a state after a mask layer is formed.
Figure 7B:
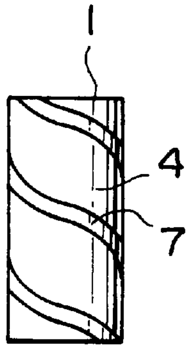

Next referring to FIGS. 7A and 7B, a mask layer 4 having a helical pattern is formed on the activated layer 7. As illustrated in FIG. 7B, the helical pattern of the mask layer 4 appears as parallel stripes with parallel helical gaps defined therebetween, as illustrated in FIG. 7B. In the parallel helical gaps of the helical pattern, a part of the activated layer 7 comprising the conductor is exposed as an exposed part.

Figure 8A:
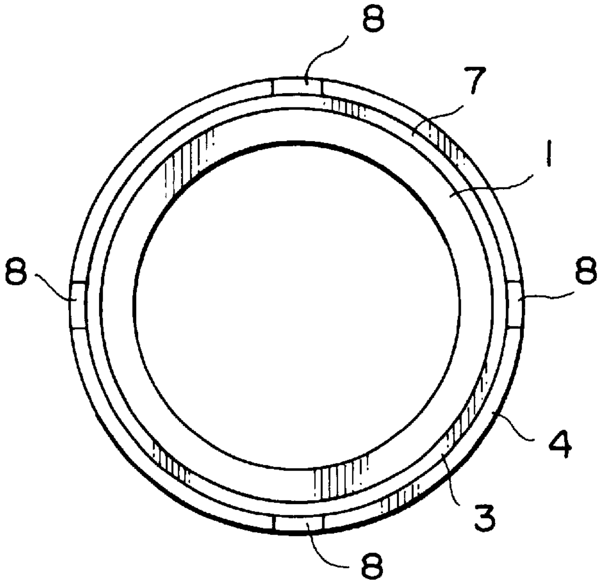
FIGS. 8A and 8B are views similar to FIGS. 7A and 7B, respectively, in a state after a metal plating layer is formed.
Figure 8B:
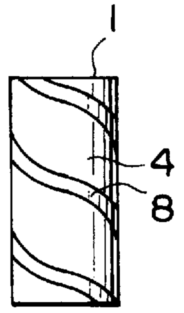

As illustrated in FIGS. 8A and 8B, the exposed part of the activated layer 7 is subjected to metal plating such as copper to form a plating layer 8. The plating layer 8 is used as a part of the antenna pattern. Now, the exposed part of the activated layer is plated and will be referred to as a plated part.

Figure 9A:
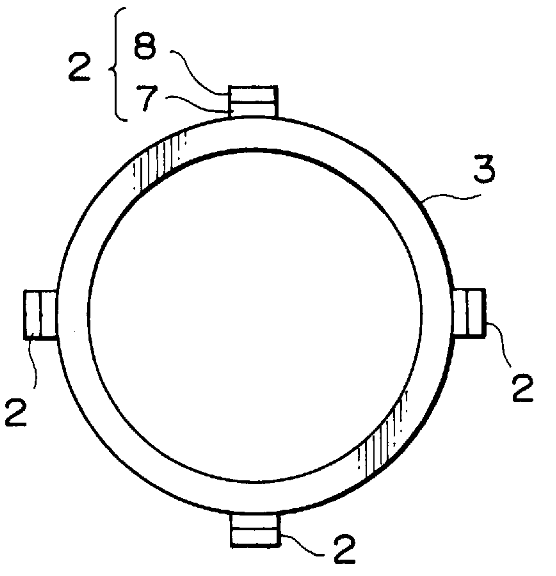
FIGS. 9A and 9B are views similar to FIGS. 8A and 8B, respectively, in a state after a helical conductor is formed.
Figure 9B:
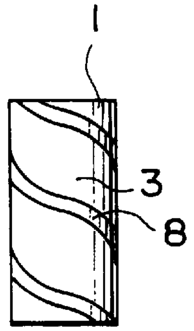

Finally, the mask layer 4 and a masked part of the activated layer 7 which is covered with the mask layer 4 are removed from the outer peripheral surface 3 of the cylindrical member 1. As a result, the plating layer 8 and the plated part of the activated layer 7 are left on the outer peripheral surface 3 of the cylindrical member 1 to serve as the antenna pattern, as illustrated in FIGS. 9A and 9B. In the above-mentioned manner, the helical antenna with the conductor 2 extending along the outer peripheral surface 3 of the cylindrical member 1 in a helical fashion is obtained.

What is claimed is:

1. A method of producing a helical antenna comprising a cylindrical member having a peripheral surface, and a helical conductor attached to said peripheral surface and helically extending along said peripheral surface, the method comprising:

preparing said cylindrical member;

forming a conductor layer on said peripheral surface of the cylindrical member;

forming a mask layer on said conductor layer with a helical gap left in said mask layer;

forming a metal plating layer on said conductor layer through said helical gap; and removing from said peripheral surface said mask layer and a masked part of said conductor layer which is covered with said mask layer, with said metal plating layer and a plated part of said conductor layer being left as said helical conductor on said peripheral surface.

2. The method according to claim 1, wherein said conductor layer is formed by applying activating treatment to said cylindrical member.

* * * * *